United States Patent
Kumar et al.

(10) Patent No.: US 10,915,734 B2
(45) Date of Patent: Feb. 9, 2021

(54) NETWORK PERFORMANCE BY INCLUDING ATTRIBUTES

(71) Applicant: Apple Inc., Cupertino, CA (US)

(72) Inventors: Atulit Kumar, Cupertino, CA (US);
Joerg A. Liebelt, San Jose, CA (US);
Onur C. Hamsici, Cupertino, CA (US);
Feng Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 16/277,544

(22) Filed: Feb. 15, 2019

(65) Prior Publication Data

US 2020/0104570 A1  Apr. 2, 2020

Related U.S. Application Data

(60) Provisional application No. 62/738,154, filed on Sep. 28, 2018.

(51) Int. Cl.
*G06K 9/00* (2006.01)
*G06N 3/04* (2006.01)

(52) U.S. Cl.
CPC ..... *G06K 9/00268* (2013.01); *G06K 9/00288* (2013.01); *G06K 9/00302* (2013.01); *G06N 3/0454* (2013.01)

(58) Field of Classification Search
CPC .......... G06K 9/00268; G06K 9/00302; G06K 9/00288; G06N 3/0454; G06N 3/0445; G06N 3/08; H04N 5/225; H04N 5/23219; H04N 5/23245
See application file for complete search history.

(56) References Cited

U.S. PATENT DOCUMENTS

| | | | |
|---|---|---|---|
| 7,768,380 B2 | 8/2010 | Breed et al. | |
| 10,083,347 B2 | 9/2018 | Kuharenko et al. | |
| 10,713,475 B2 * | 7/2020 | Gernoth | G06K 9/00302 |
| 2005/0147292 A1 * | 7/2005 | Huang | G06K 9/00228 382/159 |
| 2016/0217198 A1 | 7/2016 | Lee et al. | |
| 2018/0012107 A1 | 1/2018 | Xu et al. | |
| 2018/0157923 A1 | 6/2018 | el Kaliouby, Jr. et al. | |
| 2018/0211099 A1 * | 7/2018 | Ranjan | G06K 9/00281 |
| 2018/0276454 A1 | 9/2018 | Han et al. | |
| 2018/0353072 A1 * | 12/2018 | Gelbman | A61B 5/0036 |
| 2019/0034704 A1 * | 1/2019 | Qiu | G06K 9/4628 |
| 2019/0057497 A1 * | 2/2019 | Vasanthakumar | G06K 9/00275 |
| 2019/0213429 A1 * | 7/2019 | Sicconi | G06F 3/013 |
| 2020/0034605 A1 * | 1/2020 | Manaharlal Kakkad | G06K 9/00771 |
| 2020/0057916 A1 * | 2/2020 | Yamamoto | G06N 3/084 |
| 2020/0098284 A1 * | 3/2020 | Yang | G06K 9/00711 |

* cited by examiner

*Primary Examiner* — Ming Y Hon
(74) *Attorney, Agent, or Firm* — Kowert, Hood, Munyon, Rankin & Goetzel, P.C.; Gareth M. Sampson

(57) ABSTRACT

An image captured using a camera on a device (e.g., a mobile device) may be operated on by one or more processes to determine properties of a user's face in the image. A first process may determine one or more first properties of the user's face in the image. A second process operating downstream from the first process may determine at least one second property of the user's face in the image. The second process may use at least one of the first properties from the first process to determine the second property.

20 Claims, 10 Drawing Sheets

NETWORK PERFORMANCE BY INCLUDING ATTRIBUTES

PRIORITY CLAIM

This patent claims priority to U.S. Provisional Patent Application No. 62/738,154 to Kumar et al., entitled "IMPROVING NETWORK PERFORMANCE BY INCLUDING ATTRIBUTES", filed Sep. 28, 2018, which is incorporated by reference in their entirety.

BACKGROUND

1. Technical Field

Embodiments described herein relate to methods and systems for determining properties of faces in images capture by a camera on a device. More particularly, embodiments described herein relate to methods and systems that determine properties of faces utilizing prior information available on the device for determining the properties.

2. Description of Related Art

Facial recognition processes may generally be used to identify an individual in an image captured on a device. A facial recognition process flow may typically include several processes operating on the device to detect and/or determine different properties of the individual's face in the image. For example, the processes on the device may include different detectors that operate on the captured image in the process flow to provide an overall assessment of the captured image. In some situations, a detector may have a difficult task in determining properties in a captured image. In such situations, a network (e.g., a neural network) operating the detector may be slowed down or less accurate due to the difficulty of the task. Providing additional information to the detector (such as information about the image itself or information about the individual being assessed in the image) may improve performance of the network in these situations and/or performance of the network in general.

SUMMARY

An imaging process on a device (e.g., a mobile device or computer system) may use prior information available on the device to assist the imaging process in operating on an image captured using a camera on the device. The prior information may include information on the device that is accessible to the imaging process. In some embodiments, the prior information includes output data from another process on the device (e.g., a process operating earlier on the device). In some embodiments, the prior information includes data stored on the device (e.g., information input by the user and/or information collected about the user on the device). Using the prior information, the imaging process may more quickly and/or more accurately determine properties of a user's face in the captured image.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
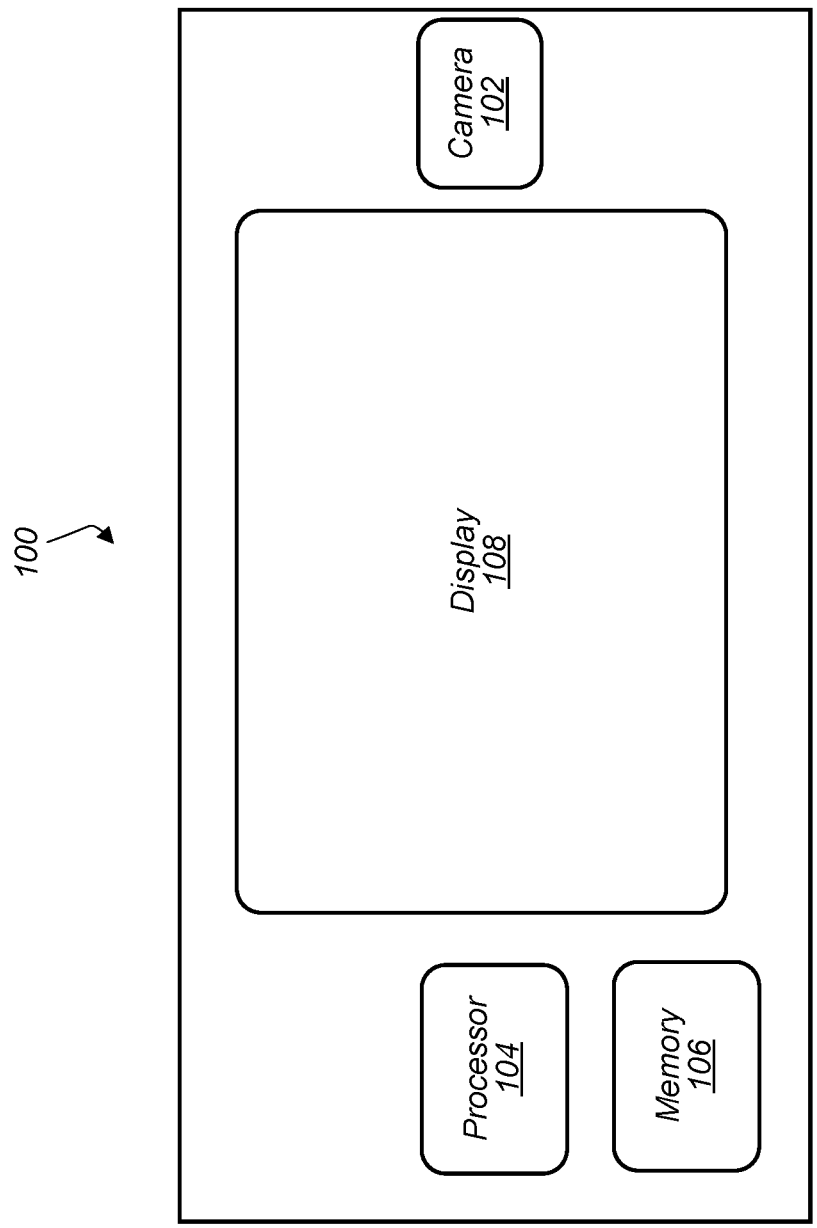
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

As described herein, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
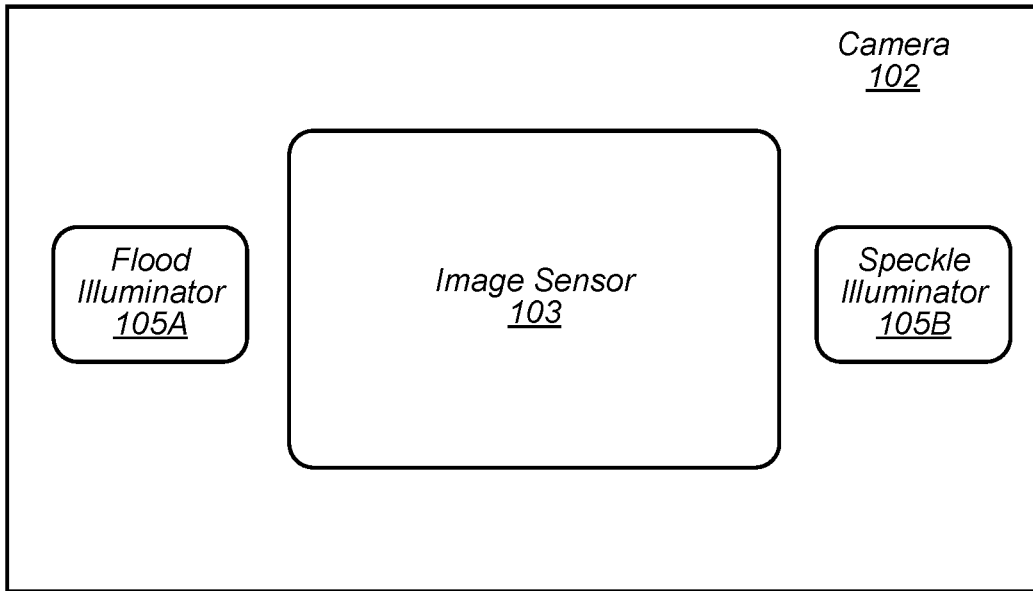
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator), illuminators for RGB light, and/or illuminators for infrared light (e.g., a flood IR source and a pattern (speckle pattern) projector). In some embodiments, the flood IR source and pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light.

For depth detection or generating a depth map image, illuminator 105B may provide IR illumination with a pattern (e.g., patterned infrared (IR) illumination). The pattern may be a pattern of light with a known, and controllable, configuration and pattern projected onto a subject (e.g., a structured pattern of light). In certain embodiments, the pattern is a speckle pattern (e.g., a pattern of dots). The pattern may, however, include any structured or semi-structured pattern of light features. For example, the pattern may include, but not be limited to, dots, speckles, stripes, dashes, nodes, edges, and combinations thereof.

Illuminator 105B may include a VCSEL array configured to form the pattern or a light source and patterned transparency configured to form the pattern. The configuration and pattern of the pattern provided by illuminator 105B may be selected, for example, based on a desired pattern density (e.g., speckle or dot density) at the subject. Examples of providing different speckle pattern densities are described in U.S. patent application Ser. No. 15/912,917 to Gernoth et al., which is incorporated by reference as if fully set forth herein. Image sensor 103 may capture images of the subject illuminated by the pattern. The captured image of the pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
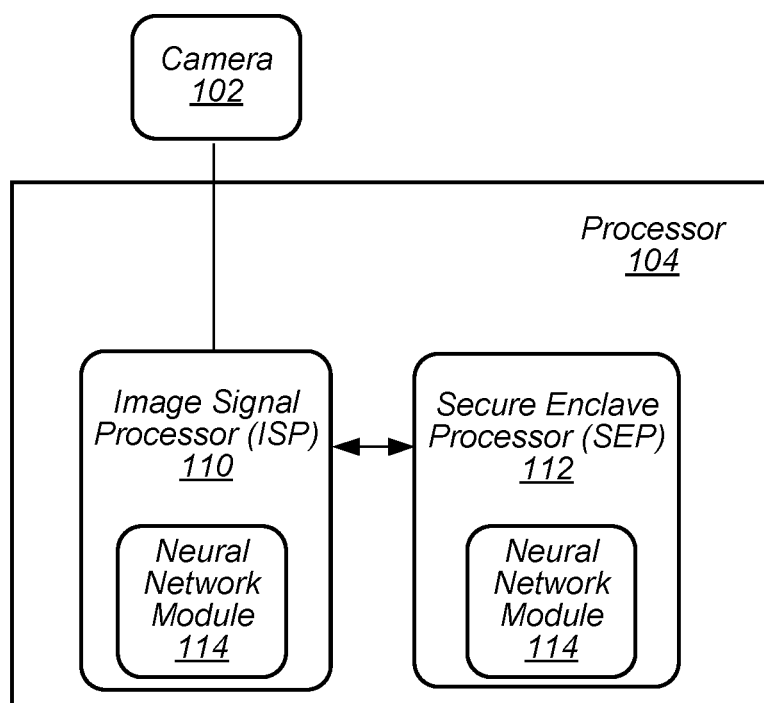
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., an image enrollment process or a registration process) to capture (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a patterned illumination image used to generate a depth map image and/or depth map image data). In certain embodiments, ISP 110 and/or SEP 112 process the flood IR images and patterned illumination images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and patterned illumination images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and patterned illumination image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Figure 4:
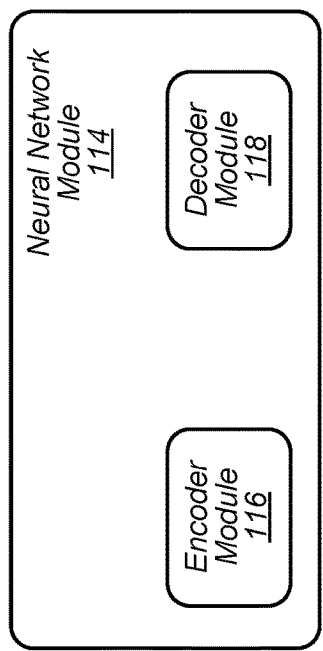
FIG. 4 depicts a representation of an embodiment of a neural network module.

FIG. 4 depicts a representation of an embodiment of neural network module 114. Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

In certain embodiments, neural network module 114 includes encoder module 116 and decoder module 118. Encoder module 116 and decoder module 118 may be machine learning models operated inside neural network module 114 (e.g., the encoder module and the decoder module are executed in neural network module). Encoder module 116 may encode images input into the encoder module and define features in the images as feature vectors in a feature space (as described herein). Decoder module 118 may decode the feature vectors in the feature space generated by encoder module 116 and provide an output (as described herein).

Figure 6:
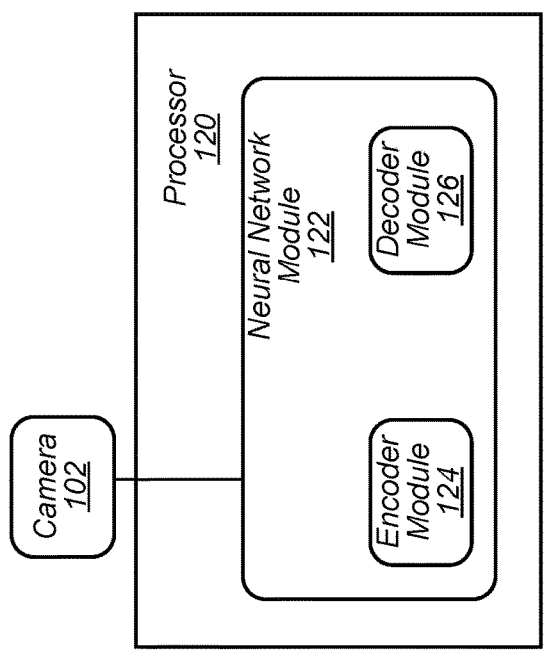
FIG. 6 depicts a representation of an embodiment of a processor with a neural network module.
Figure 5:
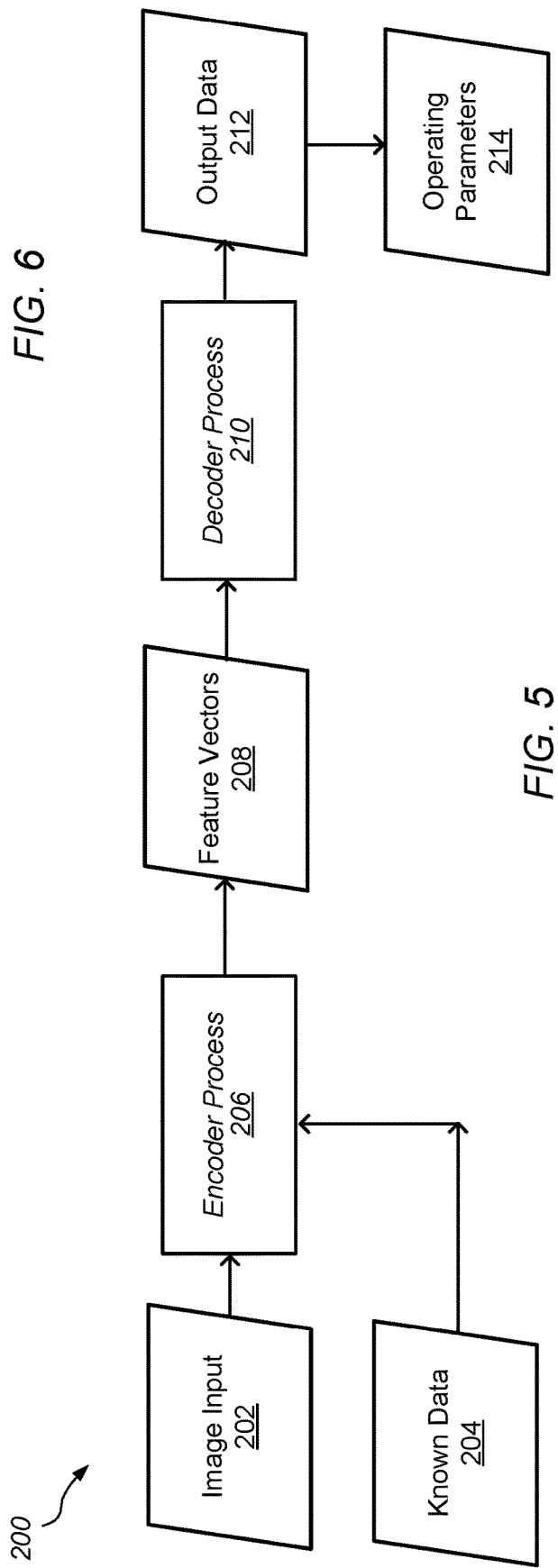
FIG. 5 depicts a flowchart for an embodiment of a training process for a neural network module.

FIG. 5 depicts a flowchart for an embodiment of training process 200 for a neural network module. In certain embodiments, training process 200 is implemented using a neural network module (e.g., a training neural network module) that is located on a computer processor other than processor 104. FIG. 6 depicts a representation of an embodiment of processor 120 with neural network module 122 that may be used for training (e.g., the training neural network module). Neural network module 122 may include encoder module 124 and decoder module 126. In certain embodiments, images that have been previously captured are provided to neural network module 122 as training images. Known properties of the training images may be provided to neural network module 122 along with the training images (e.g., the training images may be augmented with the known properties). In some embodiments, camera 102 may be coupled to processor 120 and/or neural network module 122. Camera 102 may be used to capture images of the training images and provide the camera-captured images to neural network module 122.

Encoder module 124 and decoder module 126 may be substantially similar or substantially the same as encoder module 116 and decoder module 118, respectively. Encoder module 124 and decoder module 126 may be located in neural network module 122 on processor 120 to be trained by training process 200. Operating parameters output generated from "trained" neural network module 122 may then be used in neural network module 114 on device 100 for implementation of the "trained" neural network module on the device.

In some embodiments, processor 120 is a GPU-enabled computer processor. Training neural network module 122 on the GPU-enabled computer processor may output operating parameters using a floating-point number representation mode. For example, operating parameters generated from "trained" neural network module 122 may include weights or kernels that are described using floating-point numbers. In such embodiments, the floating-point operating parameters may need to be converted to integer number representations before being used on neural network module 114 on device 100. Any conversion process known in the art may be used to convert the operating parameters from the floating-point number representation mode to the integer number representation mode.

In certain embodiments, as shown in FIG. 5, training process 200 begins with providing image input 202. Image input 202 may include training images provided to training process 200 (e.g., training images augmented or annotated (e.g., labelled) with the known information as described above are provided to the training process). In some embodiments, image input 202 includes training images captured with camera 102 or otherwise provided to training process 200 (e.g., digitally provided to the training process). Training images may include reference images or other sample images obtained from a database of images. For example, training images may be obtained from ImageNet or another similar image database. In certain embodiments, training process 200 is implemented on flood IR illumination images to train the neural network module for operating on such images. In some embodiments, training process 200 is implemented on patterned illumination images (e.g., images used to generate depth map images) to train the neural network module for operating on such images. Operating on images may include, but not be limited to, face detection, facial feature detection (e.g., landmark (eyes, nose, mouth, etc.) detection, gaze estimation, smile estimation, etc.), facial pose estimation, occlusion detection, attention detection, facial recognition authentication (e.g., facial matching) or any other process involving a neural network module operating on images with faces to assess properties or features of the faces.

Image input 202 may include a plurality of training images with a variety of different users and/or faces in the images. In some embodiments, the faces in the images have varying properties in the images. For example, the faces in the images may have different poses, different locations in the images, different gazes, different smiles, different attentions, etc. The properties of the faces in the training images may be known (e.g., the images have labels or other indicia identifying the known information of the properties). The known information for the properties may be provided into training process 200 as known data 204. In some embodiments, the training images are augmented with known data 204.

As shown in FIG. 5, image input 202 may be provided to encoder process 206. Encoder process 206 may be performed by, for example, encoder module 124, shown in FIG. 6. In encoder process 206, shown in FIG. 5, the encoder module may encode images input into the encoder process and define features in the images as feature vectors in a feature space. For example, the encoder module may define facial features in a user's face (and other features in the images) as feature vectors in the feature space. Encoder process 206 may output feature vectors 208. Feature vectors 208 (e.g., the output of encoder process 206 (and the encoder module)) includes feature vectors representing the user's facial features (and/or other features in the images) in the feature space. A feature space may be an N-dimensional feature space. A feature vector may be an n-dimensional vector of numerical values that define features in the image for a region in the feature space that corresponds to a region in the image. For example, in some embodiments, the feature vector may be a 1024-dimensional vector. Any number of dimensions may be implemented in various embodiments.

In certain embodiments, the encoder module used in encoder process 206 (e.g., encoder module 124, shown in FIG. 6) is a neural network. For example, the encoder module may be a multi-scale neural network or another neural network where the scale of kernels used in the network can vary. In certain embodiments, the encoder module is a multi-scale convolutional neural network. Using a multi-scale convolutional neural network, encoder process 206 may generate a high-level representation of image input 202 with high-level feature vectors in the feature space. For example, encoder process 206 may generate a 32×32 grid representation with a feature vector in each region (cell) of the grid whereas the input image may have a higher resolution (e.g., image input 202 may be a 256×256 image).

As shown in FIG. 5, feature vectors 208 may be provided into decoder process 210. Decoder process 210 may be performed by, for example, decoder module 126, shown in FIG. 6. In decoder process 210, the decoder module may decode the feature vectors in the feature space of feature vectors 208 generated in encoder process 206. In certain embodiments, decoding the feature vectors includes operating on the feature vectors with a regressor or regression-enabled network to determine (e.g., extract) output data 212 from image input 202. In some embodiments, decoding the feature vectors includes operating on the feature vectors with one or more classifiers or a classification-enabled network to determine output data 212 from image input 202. Output data 212 may include, for example, information or properties about faces in image input 202, as described herein.

In certain embodiments, the decoder module used in decoder process 210 (e.g., decoder module 126) is a neural network. For example, the decoder module may be a recurrent neural network (RNN). In certain embodiments, the recurrent neural network includes a gated recurrent unit (GRU). Other recurrent neural networks may, however, also be used such as a long short-term memory (LSTM) recurrent neural network.

In training process 200, the properties of a face in the image input 202 is known and may be correlated with the decoded feature vectors. As decoder process 210 operates on feature vectors in the feature space, the decoder module may provide one or more predictions for the face in image input 202.

In certain embodiments, the predictions generated by decoder process 210 includes assessments (e.g., determinations) of one or more properties of the face. The assessed properties may include, but not be limited to, a detection and position of the face in the image (which may be represented, for example, by a bounding box for the face in the image), a pose of the face (e.g., the pose of the face in the bounding box), a distance between the face and the camera, landmark detection and positions, gaze estimation for the face, smile estimation for the face, occlusion detection and positions, and attention estimation for the face. Pose of the face may include pitch, yaw, and/or roll of the face. The assessed properties may be included in output data 212.

In training process 200, the values of the properties of the face may be determined by correlating decoded feature vectors with known data 204. For example, known data 204 may provide known properties of the face(s) in image input 202 with the known properties defining the properties assessed by decoder process 210. In certain embodiments, during training process 200, correlating decoded feature vectors with known data 204 includes the decoder module for decoder process 210 assessing differences between decoded feature vectors and known data 204. The detector module may, for example, perform error function analysis (or similar analysis) on the differences between the decoded feature vectors and known data 204 and refine the feature vector decoding process until the feature vector decoding process accurately determines the known data. Thus, as multiple training images are processed in training process 200, decoder process 210 (and encoder process 206) may be trained by the training images in image input 202 and known data 204 to accurately assess values of properties of the face(s).

As described, training process 200 may include training encoder process 206 and decoder process 210 (and their corresponding encoder and decoder modules) on a plurality of training images with a variety of different users and/or faces in the images along with varying properties of the faces in the images. After training process 200 is completed on a set of training images, operating parameters 214 may be generated by the training process based on the correlation between the decoded features vectors and known data 204. Operating parameters 214 include parameters useable in neural network module 122 (e.g., encoder module 124 and decoder module 126), shown in FIG. 6, to assess images input into the neural network module from camera 102 and assess values of properties of the face(s), as described above.

Figure 7:
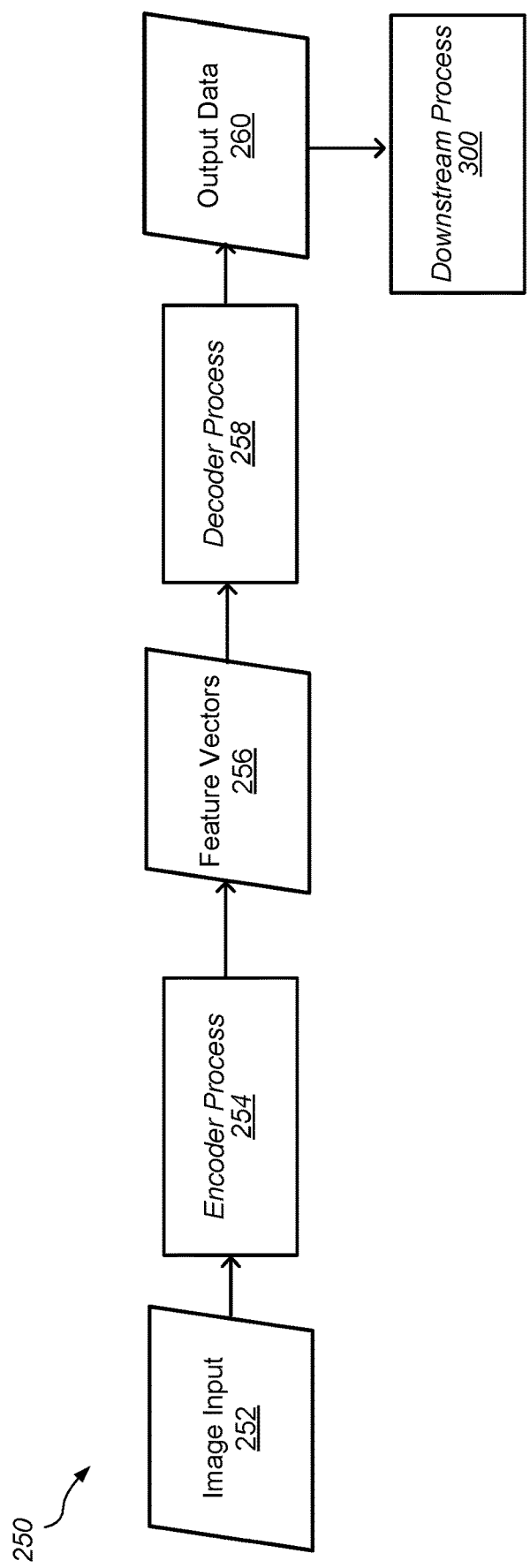
FIG. 7 depicts a flowchart for an embodiment of an operation implemented using a neural network module on a device.

After operating parameters are provided to neural network module 114, the neural network module may operate on device 100 to implement a process on the device. FIG. 7 depicts a flowchart for an embodiment of process 250 implemented using neural network module 114 on device 100. Image input 252 may include an image captured using camera 102 on device 100. The captured image may be a flood IR illumination image or a patterned illumination image. Process 250 may include any process involving neural network module 114 operating on image input 252 to assess properties or features of face(s) in the image input. For example, process 250 may include face detection, facial feature detection (e.g., landmark (eyes, nose, mouth, etc.) detection, gaze estimation, or smile estimation), facial pose estimation, occlusion detection, attention detection, or facial recognition authentication (e.g., facial matching).

In certain embodiments, process 250 includes providing the captured image from image input 252 to encoder process 254. Encoder process 254 may be performed by encoder module 116, shown in FIG. 4. In certain embodiments, encoder module 116 is a multi-scale convolutional neural network (e.g., encoder module 116 is substantially the same neural network as encoder module 124). In encoder process 254, encoder module 116 may encode image input 252 to represent features in the image as feature vectors in a feature space. Encoder process 254 may output feature vectors 256. Feature vectors 256 may be, for example, encoded image features represented as vectors.

Feature vectors 256 may be provided into decoder process 258. Decoder process 258 may be performed by decoder module 118, shown in FIG. 4. In certain embodiments, decoder module 118 is a recurrent neural network (e.g., decoder module 118 is substantially the same neural network as decoder module 126). In decoder process 258, the decoder module may decode feature vectors 256 to assess one or more properties of image input 252 to determine (e.g., extract) output data 260 from the image input. Decoding the feature vectors may include performing a regression on the feature vectors and/or classifying the feature vectors using parameters determined during training process 200. Classifying the feature vectors may include operating on the feature vectors with one or more classifiers or a classification-enabled network.

When process 250 operates on a face in image input 252, output data 260 from decoder process 258 may include assessments (e.g., determinations) of one or more values of properties of the face in the image input. For example, the properties may include detection and position of landmarks (e.g., eyes, nose, and mouth) on the face, estimation of gaze of the face (e.g., where the person in the image is looking), estimation of smile on the face (e.g., estimation of position of ends of mouth versus center of mouth), estimation of pose of the face (e.g., pitch, yaw, and roll of the face in the image), detection and position of occlusion on the face in the image, and/or estimation of attention (e.g., is the person in the image attentive to device 100).

In some embodiments, assessing values of properties of the face may include using a regressor on the feature vectors, during decoding of the feature vectors, using parameters obtained from training process 200 that are associated with the properties being assessed. In some embodiments, assessing values of properties of the face may include classifying the feature vectors, during decoding of the feature vectors, using classifying parameters (obtained from training process 200) that are associated with the properties being assessed. In some embodiments, assessed values of the properties of the face may be included in output data 260 along with other decisions made by process 250 (e.g., detection of a face in image input 252 and determination of a bounding box for the detected face).

Figure 8:
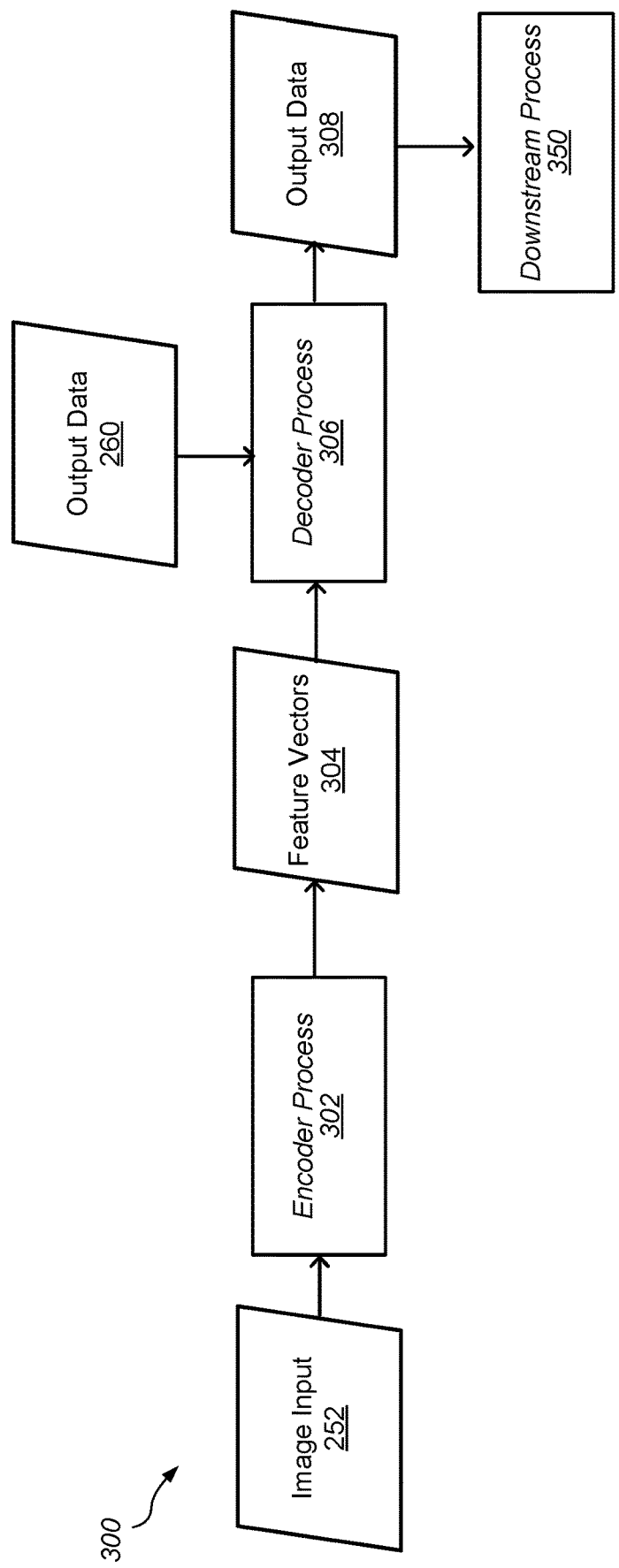
FIG. 8 depicts a flowchart for an embodiment of another operation implemented using a neural network module on a device.

In certain embodiments, output data 260 from process 250 is provided to a downstream process (e.g., downstream process 300, as shown in FIG. 7). FIG. 8 depicts a flowchart for an embodiment of downstream process 300 that utilizes output data 260. Process 300 may be implemented using a neural network module on device 100. In some embodiments, process 300 is operated using a different neural network module from process 250. In some embodiments, process 300 and process 250 are operated using the same neural network module (e.g., neural network module 114).

Process 300 may include any process (e.g., set of operations) downstream of process 250 on device 100. In certain embodiments, process 300 is a process that further operates on image input 252 to assess (e.g., determine) additional properties of the face in the image input. For example, process 300 may be a process described above other than process 250. As further example, process 250 may assess face(s) detection and/or pose information for face(s) in image input 252 while process 300 may assess gaze estimation for face(s) in the image input. Other examples of process 300 include, but are not limited to, processes such as additional image signal processing and security enclave processing such as facial recognition processing or attention detection processing. In some embodiments, one or more values in output data 260 are used to control one or more operations of device 100 associated with process 300.

In certain embodiments, as shown in FIG. 8, process 300 operates on image input 252 (e.g., the same image input as process 250). Process 300 may operate substantially similarly to process 250. For example, process 300 may include encoder process 302 to generate feature vectors 304. Feature vectors 304 may then be decoded in decoder process 306 to generate output data 308. As described above, output data 308 from process 300 may include different output data than output data 260 from process 250. Output data 308 may then be provided to downstream process 350. Downstream process 350 may be yet another process or set of operations that is downstream of process 300. Process 350 may, for example, operate substantially similarly to process 250 and/or process 300 to provide additional output data for image input 252 or process 350 may, for example, include security enclave processing such as facial recognition processing.

In certain embodiments, output data 260 from process 250 is utilized by process 300. For example, process 300 may utilize properties of the face determined by process 250 and provided in output data 260 as additional input into process 300 (e.g., the downstream process). Utilizing output data 260 from process 250 in process 300 may improve the performance of process 300. For example, process 300 may be capable of determining output data 308 more quickly and/or output data 308 determined by process 300 may more accurate (e.g., the output data determined by the process may be more accurate in representing actual elements in the capture images).

Figure 9:
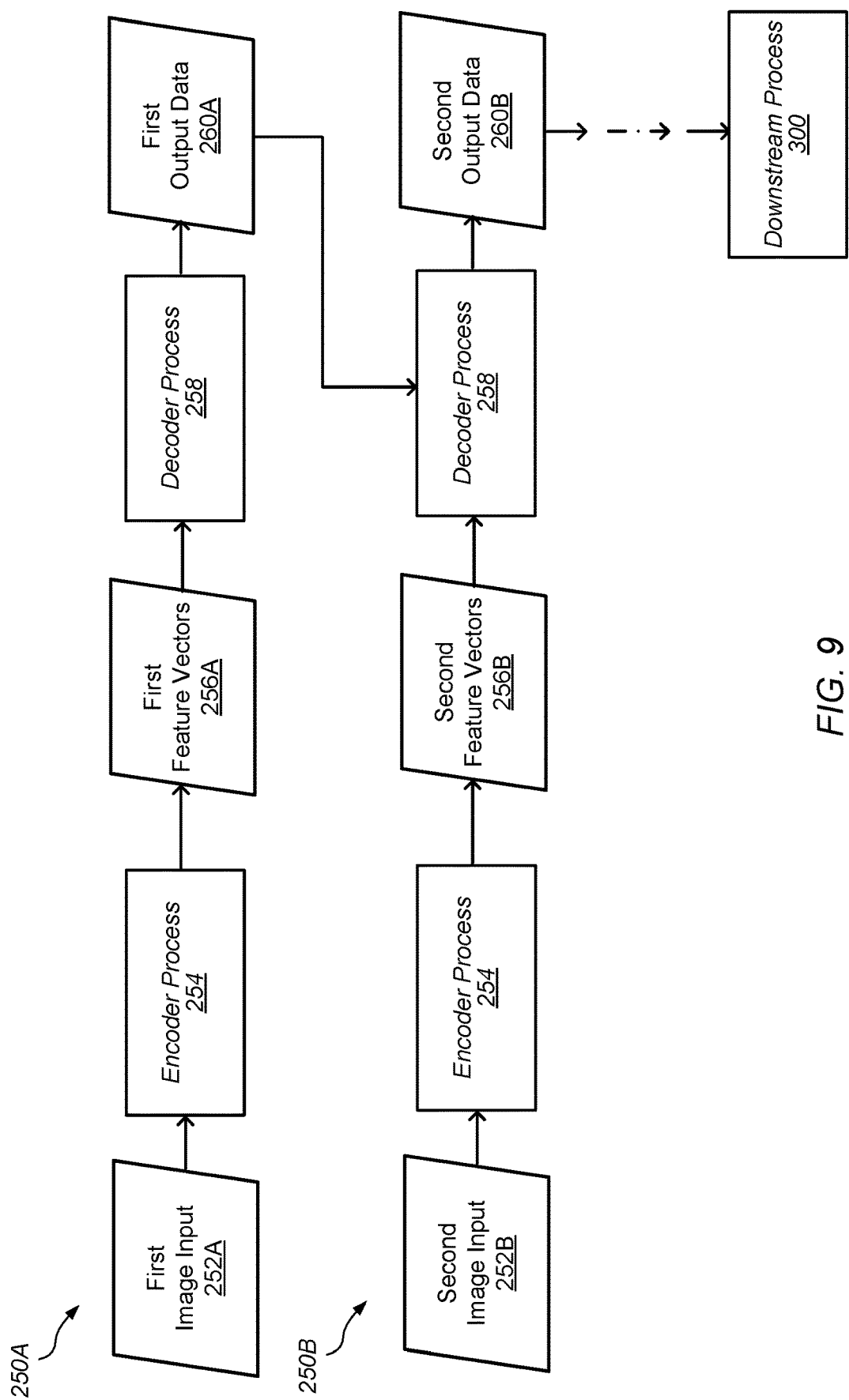
FIG. 9 depicts a flowchart for an embodiment of a process using output data from a first image to operate on a second image.

In some embodiments, output data from a process is used in the same process for processing subsequently captured images (e.g., the output data from the process for a first image is used in the process for operating on a second image). FIG. 9 depicts a flowchart for an embodiment of a process using output data from a first image to operate on a second image. Process 250A and process 250B may be substantially the same process with process 250A operating on first image input 252A and process 250B operating on second image input 252B. For example, process 250A and process 250B may be operated using the same neural network module with different image input. In some embodiments, process 250A and process 250B operate on successively captured images (e.g., second image input 252B is captured subsequent to first image input 252A).

As shown in FIG. 9, process 250A may operate on first image input 252A using encoder process 254 to generate first feature vectors 256A. Decoder process 258 may then operate on first feature vectors 256A to generate first output data 260A. First output data 260A is then the output data for first image input 252A (e.g., the first captured image).

Process 250B may operate on second image input 252B (e.g., the second captured image) using encoder process 254 to generate second feature vectors 256B. Decoder process 258 may then operate on second feature vectors 256B to generate second output data 260B. Second output data 260B may then be used in a downstream process (e.g., downstream process 300) or in addition operations of process 250 (e.g., operations of process 250 on additional captured images).

In some embodiments, first output data 260A is utilized in process 250B. For example, as shown in FIG. 9, first output data 260A may be utilized in decoder process 258 of process 250B (e.g., the first output data is applied to the decoder process). Utilizing output data 260 from process 250A (e.g., output data from the first captured image) may improve the performance of process 250B operating on second image input 252B (e.g., the second captured image). For example, utilizing output from the earlier captured image (e.g., output from process 250A) in assessing the later captured image (e.g., second image input 252B) may provide more stability in the operation of the subsequent process (e.g., process 250B). Thus, the overall operation of process 250 (include all iterative operations of process 250A, 250B, etc.) may be more adaptable to variations between image inputs and thus be more robust.

Figure 10:
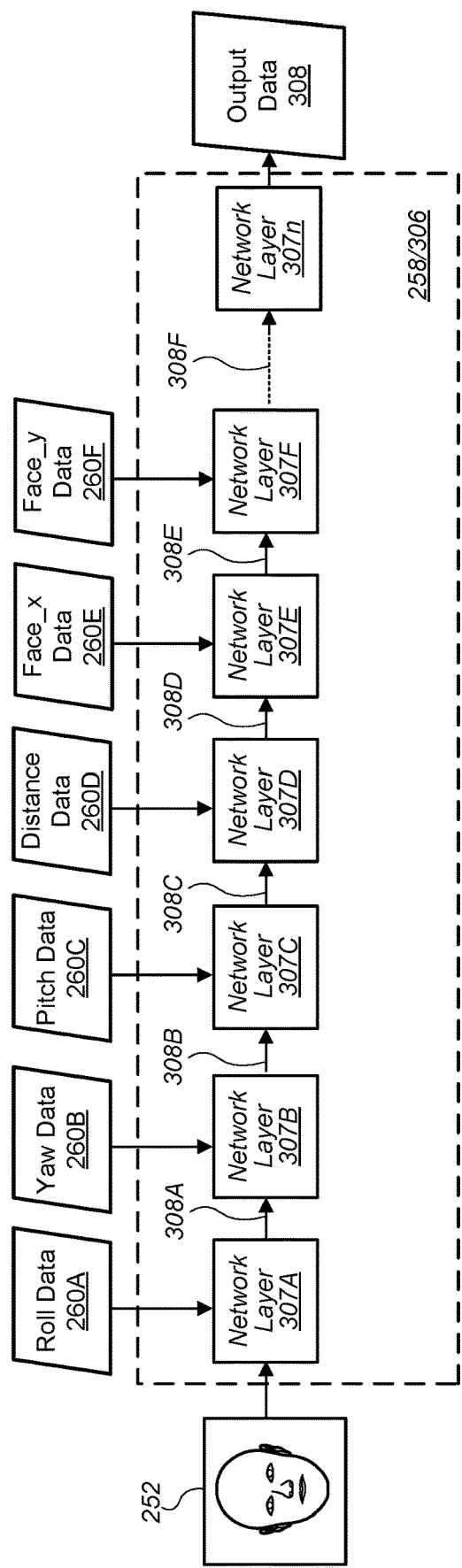
FIG. 10 depicts a flowchart of an example of one embodiment using output data in a decoder process.

FIG. 10 depicts a flowchart of an example of one embodiment using output data 260 in a decoder process (e.g., decoder process 258, shown in FIGS. 7 and 9, or decoder process 306, shown in FIG. 8). In one embodiment of the example depicted in FIG. 10, process 250 (shown in FIG. 7) is a face detection process and decoder process 258/306 is used in a downstream process (e.g., process 300) to determine a gaze of the user from image input 252.

When process 250 is a face detection process, the face detection process may determine a bounding box around the detected face (determined, for example, by x- and y-coordinates for the bounding box) as well as pose information and distance information for the face in the bounding box. The pose information may include, for example, pitch, yaw, and roll data for the detected face. Distance information may include the distance between the detected face and camera 102 on device 100. Following the face detection process, process 300 may determine (e.g., estimate) gaze information for the face in the bounding box. Estimating gaze information may include, for example, estimating coordinates for where the face in the bounding box is looking on display 108 of device 100 (e.g., estimating where the eyes of the face are looking using x-y coordinates on the display of the device).

In certain embodiments, as shown FIG. 10, roll data 260A, yaw data 260B, and pitch data 260C are attributes or properties for the pose information (e.g., attributes or properties in output data 260). Distance data 260D may be the attributes or properties for the distance information and face_x 260E and face_y 260F may be the x- and y-coordinates, respectively, of the bounding box for the detected face. As shown FIG. 10, these attributes may be applied to different layers of the network (e.g., a neural network module) operating decoder process 306.

In certain embodiments, as shown in FIGS. 8-10, attributes or properties from output data 260 (e.g., roll data 260A, yaw data 260B, pitch data 260C, distance data 260D, face_x 260E, and face_y 260F) are utilized in (e.g., applied to) decoder process 258/306. Application of these attributes or properties from output data 260 to decoder process 258/306 may assist or help the decoder process to determine output data 308. For example, applying attributes from output data 260 to decoder process 258/306 may provide constraints or boundaries to decoder operations run by the neural network module. Providing the constraints or boundaries may reduce the search space for the neural network module to assess and determine output data 308 using decoder process 258/306.

In certain embodiments, decoder process 258/306 is a recurrent neural network operating using network layers (e.g., a neural network operating using convolutional network layers). In such embodiments, as shown in FIG. 10, decoder process 258/306 may include network layers 307A-307F, where each network layer generates an output (e.g., outputs 308A-308F). A final network layer 306n (for n network layers) may then generate a final output (e.g., output data 308). In the embodiment of a gaze estimation, output data 308 may include an estimation of gaze for the face detected by process 250.

In certain embodiments, roll data 260A, yaw data 260B, pitch data 260C, distance data 260D, face_x 260E, and face_y 260F (e.g., the attributes or properties from output data 260) are applied separately to individual network layers (e.g., network layers 307A-307F). For example, as shown in FIG. 10, roll data 260A is applied to network layer 307A, yaw data 260B is applied to network layer 307B, pitch data 260C is applied to network layer 307C, etc. In some embodiments, attributes (e.g., data 260A-260F) are applied in order from the easiest to the hardest attributes (e.g., from the easiest attribute to apply to the hardest attribute to apply). For example, the attributes of roll data 260A, yaw data 260B, and pitch data 260C, the roll data is the easiest to apply while the pitch data is the hardest to apply. In some embodiments, the order that attributes (e.g., data 260A-260F) are applied may be based on the impact of the attributes on features being determined by decoder process 258/306. For example, roll data 260A may have a higher impact on determining features than yaw data 260B, which has a higher impact than pitch data 260C. Thus, roll data 260A may be applied first and pitch data 260C may be applied after yaw data 260B, as shown in FIG. 10. Applying easier attributes before harder attributes and/or applying more impactful attributes earlier may improve the performance of decoder process 258/306 (e.g., the decoder process may be more efficient and/or more accurate in determining output data 308).

Determination of which attributes are easier or which attributes are harder and/or determination of the impact of attributes may depend on the operation of decoder process 258/306 (e.g., the problem being solved by the decoder process). In some embodiments, the neural network module may learn (e.g., during training process 200) which attributes to apply when. Learning may include, for example, defining affects for the different attributes that determine the order in which the attributes are applied. In some embodiments, the order for applying the attributes may be manually determined (e.g., determined by a network programmer or designer).

In certain embodiments, data 260A-260F are applied as values (e.g., scalar values) to network layers 307A-307F in decoder process 258/306. Applying data 260A-260F as scalar values may shift the output of network layers 307A-307F. For example, network layers 307A-307F may be convolutional layers with a convolution applied to the input to the layers (e.g., weight×input). A bias (e.g., a scalar value) may then be added to output of the convolution. Thus, each network layer may be: weight×input+bias. Data 260A-260F may be applied to network layers as and added scalar value to the bias of each layer. For example, roll data 260A may be applied as a scalar value (e.g., an angle in radian) to the bias for network layer 307A. Yaw data 260B and pitch data 260C may be similarly applied to network layers 307B and 307C, respectively. Distance data 260D, face_x data 260E, and face_y data 260F may be applied as normalized values (e.g., 0 to 1) to network layers 307D, 307E, and 307F, respectively.

In some embodiments, data 260A-260F are applied with different weights (e.g., different weights are used for the values applied to the network layers). It should be noted that the weights applied to data 260A-260F are not the same as the weights used in the convolution applied to the input to network layers 307A-307n, described above. The weights applied to data 260A-260F may be determined during a training process for the neural network module (e.g., during training process 200 described herein). For example, weights to be applied for each of roll data 260A, yaw data 260B, and pitch data 260C may be learned during the training process and set as operating parameters for device 100. The neural network module operating decoder process 258/306 may learn (e.g., during training process 200) to correlate the shifts in output with the input provided and, during operation on device 100, the neural network module may apply weights based on the input (e.g., data 260A-260F) being received.

In some embodiments, the attributes (e.g., data 260A-260F) are applied to decoder process 258/306 using other methods. For example, a combination of data 260A-260F may be used as input for individual network layers 307A-

Figure 11:
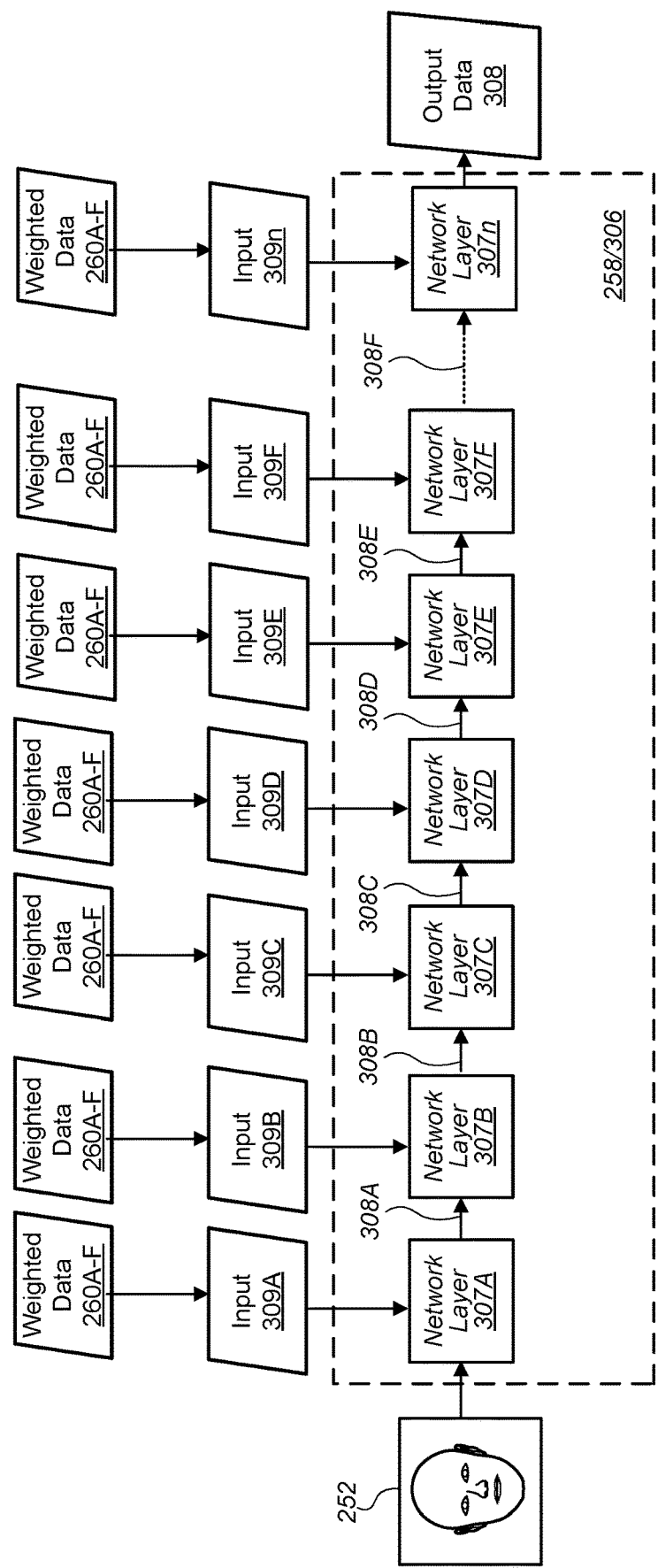
FIG. 11 depicts a flowchart of another example of an embodiment using output data in a decoder process.

307n. FIG. 11 depicts a flowchart of an example of an embodiment using combinations of output data in decoder process 258/306. As shown in FIG. 11, inputs 309A-309n to each network layer 307A-307n may include a combination of data 260A-260F.

Inputs 309A-309n may be weighted combinations with different weights being applied to each piece of data 260A-260F for each input. For example, a weighted combination for input 309A may include a first weight applied to roll data 260A, a second weight to yaw data 260B, a third weight applied to pitch data 260C, a fourth weight applied to distance data 260D, a fifth weight applied to face_x data 260E, and a sixth weight applied to face_y data 260F. As described above, the weights to be applied to data 260A-260F may be determined during a training process for the neural network module (e.g., during training process 200).

Determined weights may be applied to data 260A-260F for each of inputs 309A-309n to generate values for each input to be used in decoder process 258/306. The values for inputs 309A-309n may then be provided to (e.g., applied to) the corresponding network layers 307A-307n in decoder process 258/306. In certain embodiments, inputs 309A-309n include scalar values that are applied to network layers 307A-307n. For example, as described above, inputs 309A-309n may be applied as scalar values to the bias in each network layer 307A-307n.

Figure 12:
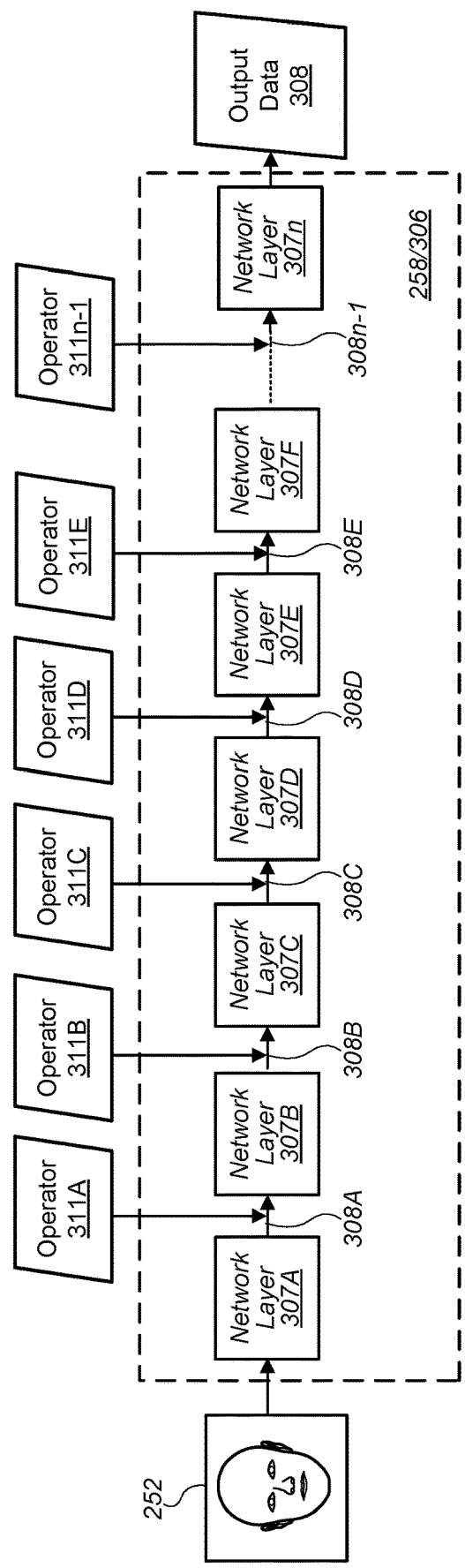
FIG. 12 depicts a flowchart of yet another example of an embodiment using output data in a decoder process.

In some embodiments, the attributes (e.g., data 260A-260F) are applied to decoder process 258/306 as an operator. FIG. 12 depicts a flowchart of an example of an embodiment using operators 311 as input in decoder process 258/306. In certain embodiments, operators 311A-311n-1 (n corresponding to the number of network layers) are applied to outputs 308A-308n-1 of network layers 307A-307n-1. Thus, operators 311A-311n-1 may update the input of the following layer based on the applied generic operator. For example, operator 311A may be applied to output 308A of network layer 307A to update the input for network layer 307B.

In some embodiments, operators 311 are generic operators or functions generated to map data 260A-260F. For example, equations to map data 260A-260F may be generated and used as operators 311. In some embodiments, operators 311 are applied as masking functions to the outputs of the network layers. In such embodiments, operators 311 may utilize data 260A-260F to mask the output of a network layer being used as input for the following network layer. For example, data 260A-260F may be used to mask or close off some of the input applied to the following network layer (e.g., a portion of the input may be cropped). Masking or closing off parts of the input may reduce the search space for the network layer, which may improve accuracy and speed of the network layer in determining an output.

The embodiments depicted in FIGS. 10, 11, and 12 using output data 260 from process 250 in decoder process 258/306 are provided as non-limiting examples of embodiments of using output data from one process (or operation) on device 100 in a downstream process (or a successive iteration of the same process) on the device to assist the downstream or successive process. It is to be understood that additional embodiments of using output data (or other data) from a first process in a second, downstream or successive process may also be contemplated. For example, any process operating on device 100 that can access prior information (e.g., output data or attributes) from another process may operate to incorporate the prior information similarly to decoder process 258/306.

Examples of other prior information available from processes operating on device 100 may include, but not be limited to, landmark information, occlusion information, exposure information, and properties of the face in the image. Properties of the face may be used, for example, as additional input for a face detection process, an attention detection process, a smile detection process, or another detection process that assesses specific facial properties. Examples of properties of the face that may be utilized include, but are not limited to, color of the face, type of face, shape of face.

In certain embodiments, as described herein, prior information (e.g., output data or attributes) is obtained from a process (e.g., process 250) operating on an image captured on device 100. In some embodiments, the prior information includes prior information obtained from other sources on device 100. For example, the prior information may be obtained from user input on device 100 (e.g., information input into the device by the user) and/or other image processing on the device (e.g., information obtained during a facial recognition enrollment process for the user). In some embodiments, the prior information obtained from these sources may be personalized for the user (e.g., the prior information is specific to the face of the user). Examples of prior information include, but are not limited to, ethnicity, age, or gender of the user.

As one example of a downstream process accessing prior information, a facial recognition authentication process (e.g., a facial matching process) may access pose information (e.g., pitch, yaw, and roll data) and use the pose information for cropping the image to increase accuracy in assessing matching of the face in the image for authentication of the user. As another example, a landmark detection process may use occlusion information to mask off areas that are occluded so that the landmark detector can more quickly and accurately assess positions of the landmarks. As described above, these are non-limiting examples and other embodiments of a process accessing prior information are possible.

In certain embodiments, one or more process steps described herein may be performed by one or more processors (e.g., a computer processor) executing instructions stored on a non-transitory computer-readable medium. For example, process 200, shown in FIG. 5, process 250, shown in FIG. 7, process 300, shown in FIG. 8, or decoder process 258/306, shown in FIGS. 10, 11, and 12, may have one or more steps performed by one or more processors executing instructions stored as program instructions in a computer readable storage medium (e.g., a non-transitory computer readable storage medium).

Figure 13:
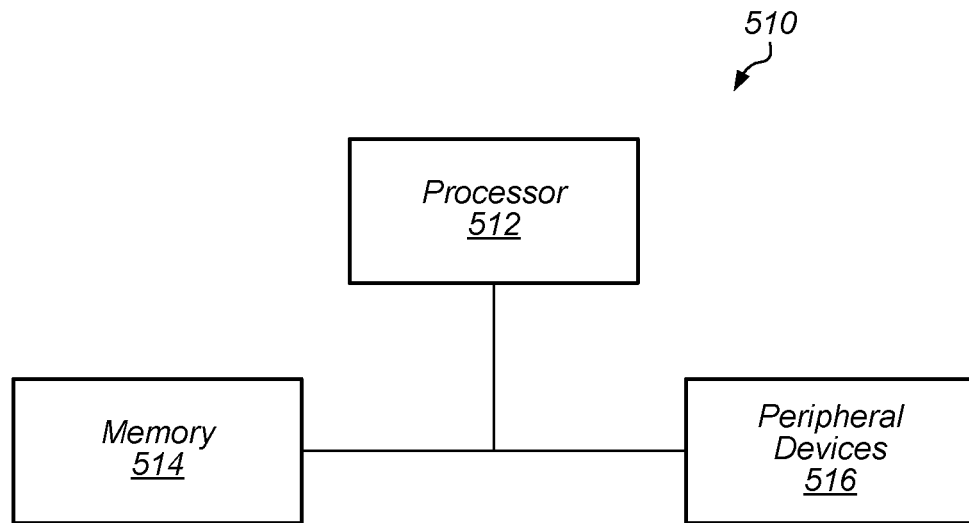
FIG. 13 depicts a block diagram of one embodiment of an exemplary computer system.

FIG. 13 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, shown in FIG. 5, process 250, shown in FIG. 7, process 300, shown in FIG. 8, or decoder process 258/306, shown in FIGS. 10, 11, and 12. In the embodiment of FIG. 13, computer system 510 includes processor 512, memory 514, and various peripheral devices 516. Processor 512 is coupled to memory 514 and peripheral devices 516. Processor 512 is configured to execute instructions, including the instructions for process 200, process 250, or process 300, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 14:
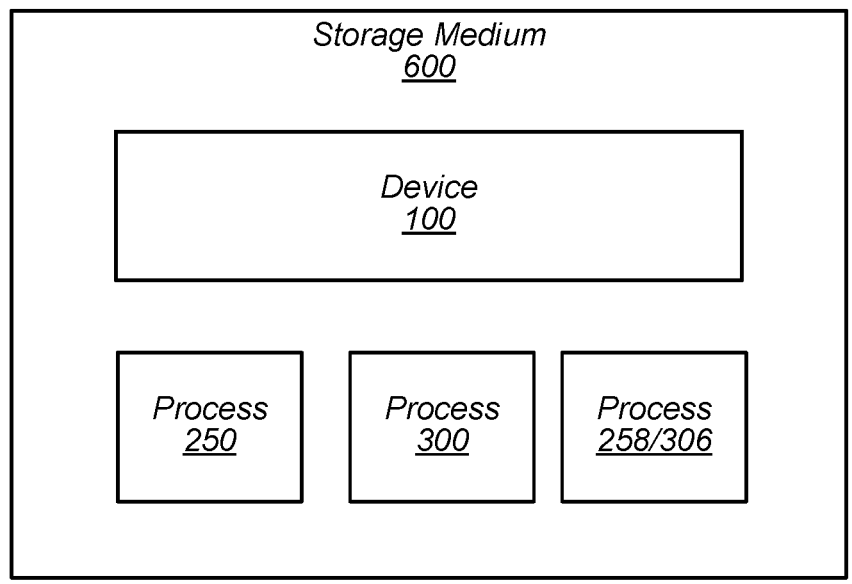
FIG. 14 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 14, other input/output (I/O) devices such as video hardware, audio hardware, user interface devices, networking hardware, etc.).

Turning now to FIG. 14, a block diagram of one embodiment of computer accessible storage medium 600 including one or more data structures representative of device 100 (depicted in FIG. 1) included in an integrated circuit design and one or more code sequences representative of process 250 (shown in FIG. 7). process 300 (shown in FIG. 8), or decoder process 258/306 (shown in FIGS. 10, 11, and 12). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A device, comprising:
a camera;
an illuminator;
a memory configured to store program instructions; and
a processor, wherein the processor is configured to execute the program instructions and to cause the device to:
capture at least one image using the camera, wherein the at least one image comprises an image captured while illuminating subjects in the image with the illuminator;
determine a plurality of first properties associated with the face in the captured image;
operate on the captured image using a neural network, wherein the neural network comprises a plurality of network layers, and wherein the neural network is configured to execute the program instructions and to cause the device to:
apply at least one of the first properties to a first network layer of the neural network;
provide a first output from the first network layer as an input to a second network layer of the neural network;
apply at least one of the first properties to the second network layer; and
provide an output from the neural network, wherein the output comprises at least one second property of the face of the user in the captured image.

2. The device of claim 1, wherein the output from the neural network is determined, at least in part, by operation of the first network layer and the second network layer.

3. The device of claim 1, wherein the first network layer comprises a convolutional network layer, and wherein the at least one first property applied to the first network layer comprises a scalar value applied to a bias of the first network layer.

4. The device of claim 3, wherein the scalar value applied to the bias of the first network layer shifts the first output from the first network layer.

5. The device of claim 1, wherein the second network layer comprises a convolutional network layer, and wherein the at least one first property applied to the second network layer comprises a scalar value applied to a bias of the second network layer.

6. The device of claim 1, wherein the processor is configured to execute the program instructions and to cause the device to operate a face detection process to determine the plurality of first properties associated with the face in the captured image.

7. The device of claim 6, wherein the plurality of first properties determined by the face detection process include a pose of the face, the pose of the face including the pitch, yaw, and roll of the face in the captured image.

8. The device of claim 7, wherein at least one of the pitch, yaw, and roll of the face is applied to the first network layer, and wherein at least one of the pitch, yaw, and roll of the face is applied to the second network layer.

9. The device of claim 8, wherein the output from the neural network comprises a gaze of the user in the captured image.

10. A method, comprising:
   capturing at least one image of a face of a user using a camera located on a device, the device comprising a computer processor, a memory, and at least one neural network associated with the computer processor, wherein the at least one image comprises an image captured while illuminating subjects in the image with an illuminator located on the device;
   determining, using the computer processor, one or more properties of the face in the captured image, wherein at least one of properties includes a pose of the face in the captured image, the pose of the face comprising pitch, yaw, and roll of the face in the captured image;
   operating on the captured image using the at least one neural network, wherein the at least one neural network comprises a plurality of network layers, and wherein operating on the captured image comprises:
      applying a first property to a first network layer of the neural network, wherein the first property includes at least one of the pitch, yaw, or roll of the face in the captured image;
      applying a second property to a second network layer of the neural network, wherein the second property includes at least one of the pitch, yaw, or roll of the face in the captured image not applied to the first network layer;
      applying a third property to a third network layer of the neural network, wherein the third property includes at least one of the pitch, yaw, or roll of the face in the captured image not applied to the first network layer and the second network layer; and
      providing an output from by the neural network, wherein the output comprises at least one additional property of the face of the user determined by the neural network.

11. The method of claim 10, wherein determining the one or more properties of the face in the captured image comprises operating a face detection process on the captured image.

12. The method of claim 10, wherein the first property, the second property, and the third property are applied as scalar values to the first network layer, the second network layer, and the third network layer, and wherein the scalar values are applied to a bias of the network layers.

13. The method of claim 10, wherein determining the one or more properties of the face in the captured image comprises determining a distance between the face of the user and the device, and wherein the method further comprises:
   applying the determined distance to a fourth network layer of the neural network.

14. The method of claim 10, wherein the first property applied to the first network layer comprises the roll of the face in the captured image, wherein the second property applied to the second network layer comprises the yaw of the face in the captured image, and wherein the third property applied to the third network layer comprises the pitch of the face in the captured image.

15. The method of claim 10, wherein the at least one additional property determined by the neural network comprises a gaze of the face of the user in the captured image.

16. The method of claim 10, further comprising operating a facial recognition authentication process using the captured image, wherein the facial recognition authentication process is used to authenticate the user to operate at least one function on the device.

17. A non-transient computer-readable medium including instructions that, when executed by one or more processors, cause the one or more processors to perform a method, comprising, comprising:
   capturing at least one image of a face of a user using a camera located on a device, the device comprising a computer processor, a memory, and at least one neural network associated with the computer processor, wherein the at least one image comprises an image captured while illuminating subjects in the image with an illuminator located on the device;
   determining, using the computer processor, one or more properties of the face in the captured image, wherein at least one of properties includes a pose of the face in the captured image, the pose of the face comprising pitch, yaw, and roll of the face in the captured image;
   operating on the captured image using the at least one neural network, wherein the at least one neural network comprises a plurality of network layers, and wherein operating on the captured image comprises:
      applying a first property to a first network layer of the neural network, wherein the first property includes at least one of the pitch, yaw, or roll of the face in the captured image;
      applying a second property to a second network layer of the neural network, wherein the second property includes at least one of the pitch, yaw, or roll of the face in the captured image not applied to the first network layer;
      applying a third property to a third network layer of the neural network, wherein the third property includes at least one of the pitch, yaw, or roll of the face in the captured image not applied to the first network layer and the second network layer; and
      providing an output from by the neural network, wherein the output comprises at least one additional property of the face of the user determined by the neural network.

18. The non-transient computer-readable medium of claim 17, further comprising providing the output from the neural network to at least one additional operation on the device.

19. The non-transient computer-readable medium of claim 17, further comprising using the output from the neural network in at least one additional image processing operation on the device.

20. The non-transient computer-readable medium of claim 17, wherein the network layers comprises convolutional layers, and wherein the pitch, yaw, and roll of the face are applied to the network layers as scalar angular values to input biases of the network layers.

* * * * *